July 17, 1962    W. E. BROWN    3,044,536
TIRE GROOVING MACHINE

Filed Feb. 18, 1960    3 Sheets-Sheet 1

INVENTOR
WILLIAM E. BROWN
BY Raymond W Cotten
ATTORNEY

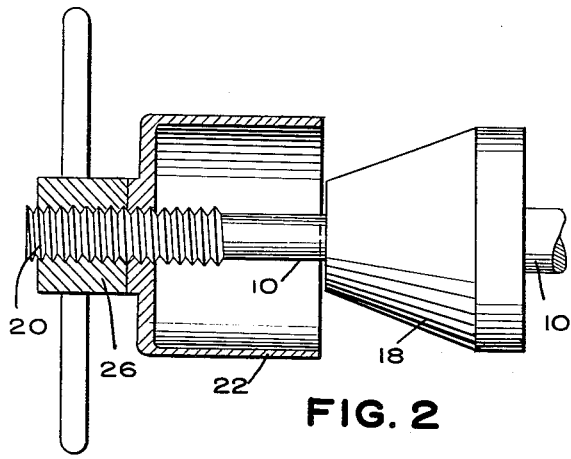
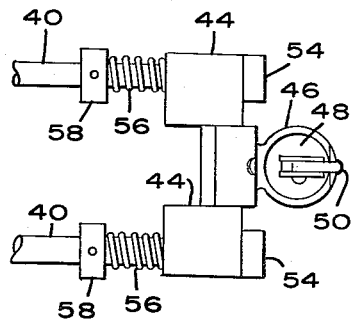
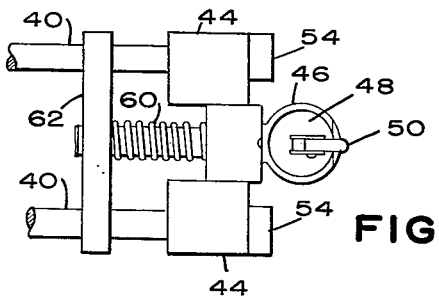
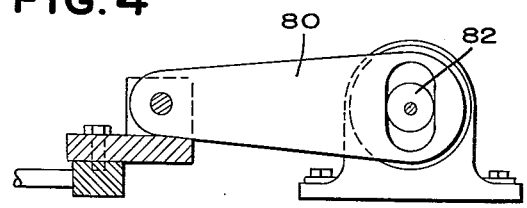
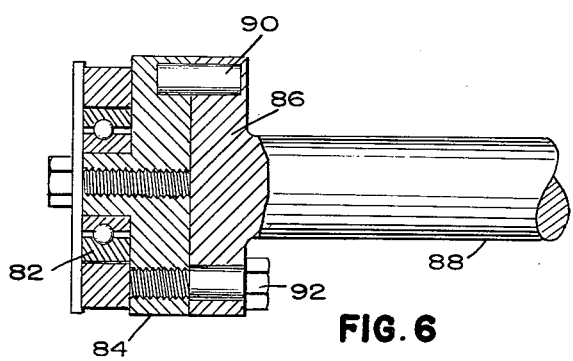
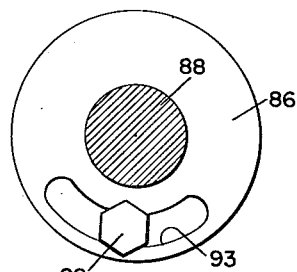

July 17, 1962 W. E. BROWN 3,044,536
TIRE GROOVING MACHINE
Filed Feb. 18, 1960 3 Sheets-Sheet 3

INVENTOR
WILLIAM E. BROWN
BY Raymond Wheaton
ATTORNEY

United States Patent Office 3,044,536
Patented July 17, 1962

3,044,536
TIRE GROOVING MACHINE
William E. Brown, 1401 Belle St., Parkersburg, W. Va.
Filed Feb. 18, 1960, Ser. No. 9,631
4 Claims. (Cl. 157—13)

This invention relates to a grooving machine and is designed primarily for regrooving the periphery of an automobile or truck tire after the original tread has worn away to such an extent that the road contacting surface of the tire has worn slick to thereby provide the tire with a new non-skid tread.

One object of the invention is to provide an automatic spring adjusting means for the cutter tool which automatically controls the depth of the groove being cut in the tire regardless of the presence or absence of low spots in the tire and without damaging the cord body of the tire.

Another object of the invention is to provide a tire grooving machine which is largely automatic and can be used by relatively unskilled persons to thereby substantially reduce the cost of grooving tires.

Another object of the invention is to provide a regrooving machine which can readily accommodate tires of different sizes without the necessity of separately adjusting the cutting tool.

Another object of the invention is to provide a regrooving machine in which the operator can constantly inspect the tire surface as it approaches the grooving tool during the grooving operation and thereby detect the presence of foreign objects, such as stones, glass or nails, in the tire which would damage the cutting tool if they were not removed prior to contact with the cutting tool.

Another object of the invention is to provide a readily retractable mounting for the cutting tool in order to retract the tool and then remove the detected foreign objects in the tire which retractable mounting when released repositions the cutting tool automatically relative to the tire for continuing the tire regrooving operation without any necessity of making any adjustments to the cutting tool.

Another object of the invention is to provide an eccentric for reciprocating the cutting tool which is readily adjustable in order to vary the width of the zig-zag of the groove being cut.

Still another object of the invention is to provide a tapered cone support for mounting the tire to be grooved that automatically trues the wheel, eliminates possibilities of slippage of the tire being grooved and also eliminates the necessity of making any adjustments for different sized wheels.

Other and further objects and advantages of the present invention should become apparent from an examination of the drawing and accompanying description.

Various features of the invention will be described in connection with the accompanying drawings showing a preferred embodiment, in which:

FIG. 2 is a detail view of the cone shaped wheel supporting means partly in section along the lines 2—2 of FIG. 1;

FIG. 3 is an enlarged plan view of the details of the mounting of the regroover cutter support on its supporting and guiding rods;

FIG. 4 is a modification of the mounting of the regroover cutter support;

FIG. 5 is a side view of the eccentric linkage along the line 5—5 of FIG. 1;

FIG. 6 is a sectional view of the eccentric shaft along the line 6—6 of FIG. 1;

FIG. 9 is an elevation looking from the right end of FIG. 6.

Figure 1:
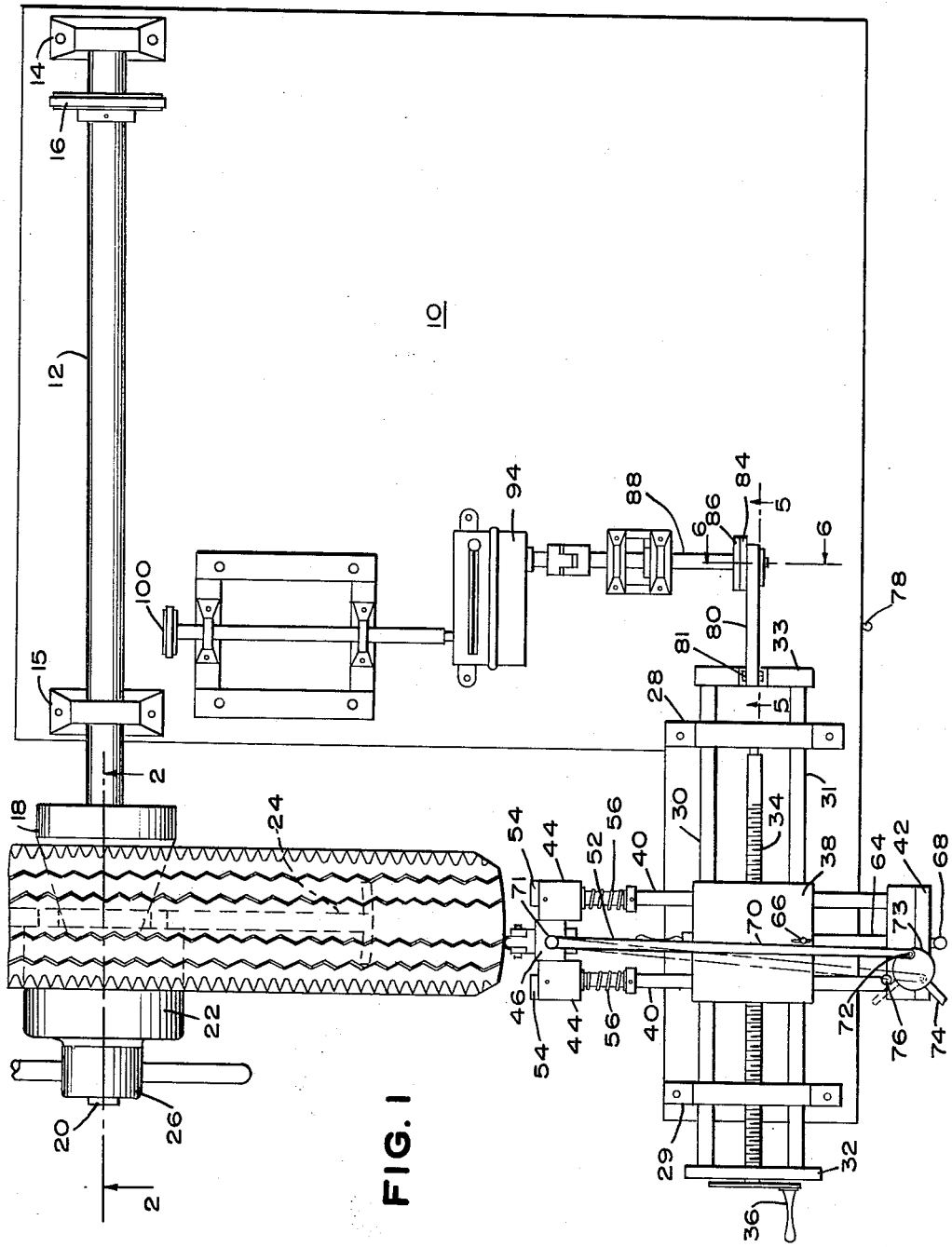
FIG. 1 is a plan view of an embodiment of the invention.
Figure 7:
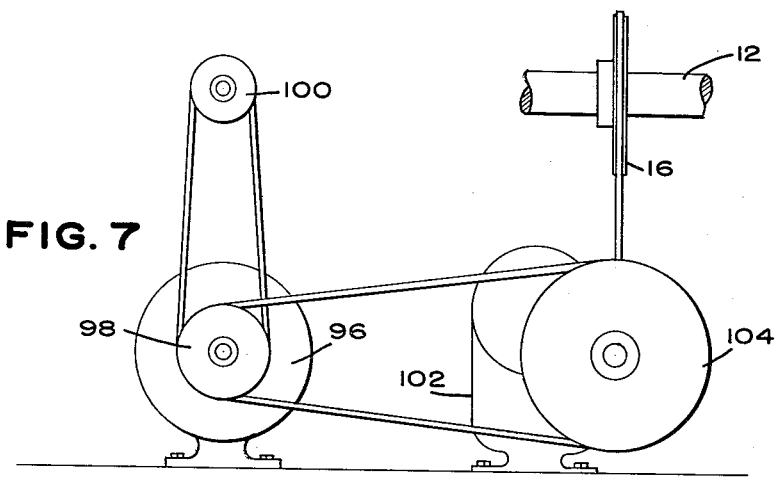
FIG. 7 is a view of the driving connections from the driving motor to the shafts for driving the tire support and the eccentric shaft.

Referring to the drawing in detail, the reference numeral 10 denotes a frame on which various parts of the tire grooving machine are mounted.

Shaft 12 located at one side of the frame 10 is mounted on bearings 14 and 15 and has a pulley 16 rigidly mounted adjacent one end and a cone shaped support 18 and extended threaded portion 20 at the other end thereof. Spacer member 22 is movably mounted on the extending end of shaft 12 and cooperates with the cone shaped support 18 to clamp a tire carrying wheel 24 in position on shaft 12 regardless of the size of the tire carrying wheel 24 by means of a wing nut 26 threaded on the extending end of shaft 12.

Bearings 28 and 29 are mounted on frame 10 on the side opposite to that on which shaft 12 is mounted and opposite to the position at which the tire carrying wheel 24 is placed. A carriage made up of a pair of shafts 30 and 31 connected at each end by connecting brackets 32 and 33 is slidably mounted in said bearings 28 and 29. A threaded shaft 34 is connected at one end to connecting bracket 32 and rotated by means of an adjusting screw handle 36. The shaft 34 is loosely mounted in bearings 28 and 29 so that it can reciprocate therein.

A platform or carriage 38 rests on shafts 30 and 31 and is adjustable thereon by means of the screw or shaft 34 in threaded engagement therewith. Platform 38 carries a pair of slidably mounted shafts 40, 40 therein connected at one end by the connecting bracket 42 and at the other end by a pair of guide blocks or heads 44, 44 to which the regroover cutter support 46 is secured.

The regroover cutter support 46 is rigidly secured to the guide blocks or heads 44, 44 at a small acute angle preferably about 16° relative to a tangent to a diameter of said tire parallel to the infeed axis of the platform carrying the regroove cutter support and inclined towards the tread portion of said tire. The regroover cutter support 46 has a regroover tool body 48 which supports a U-shaped electrically heated cutting tip 50 of a type well known in the prior art such, for example, as shown at 302 in FIGS. 10 and 12 of the patent to Love, No. 2,891,605, issued June 23, 1959. Cable 52 supplies current to the heating element for the regroover cutting tip 50.

Figure 8:
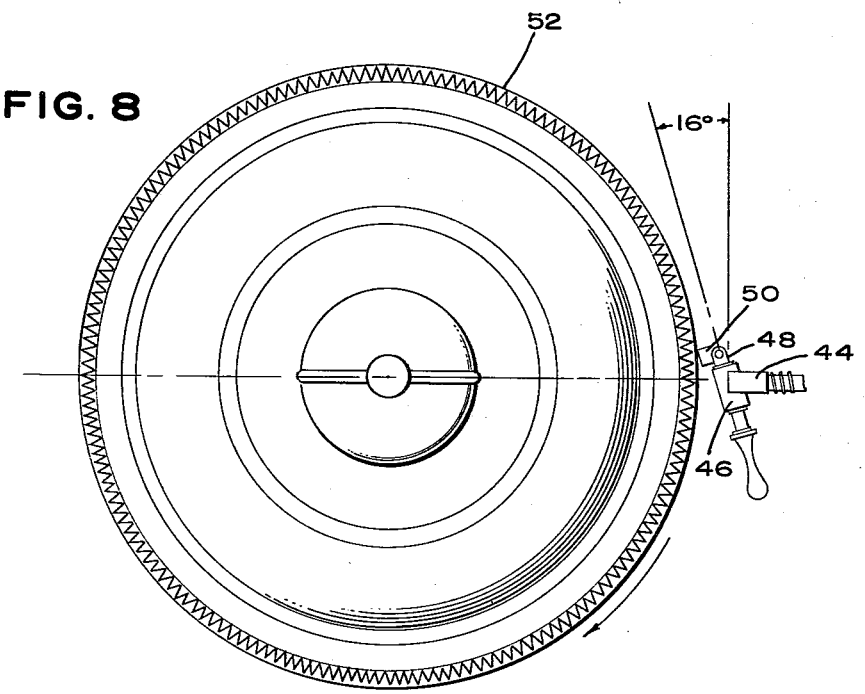
FIG. 8 is an end view showing the cutting tip of the regroover cutter support engaging the surface of the tire being grooved.

The cutting tip 50 contacts the tread portion 52 of the tire to be regrooved which is first properly inflated to correct tire pressure at a point slightly above the diameter of said tire referred to above, preferably about 1½ inches, above the diameter aforesaid at an acute angle of about 16° relative thereto. In said regrooving operation the tread surface 52 rotates in a clockwise direction relative to the cutting tip 50 as shown in FIG. 8 so that the cutting tip 50 is always cutting away from the tire during the regrooving operation.

Each one of shafts 40, 40 has a stop collar 54 rigidly mounted on one end to limit the forward movement of the guide blocks or heads 44, 44 which are biased in a forward direction against the stop collars 54, 54 by means of springs 56, 56 one of which encircles each one of the shafts 40, 40 and is held in position on the shafts by means of stop collars 58, 58.

The modification of the tensioning means for the guide blocks or heads 44, 44 carrying the regroover cutter support 46 shown in FIG. 4 discloses a simpler construction than that of FIG. 3 described above in that it utilizes only one biasing spring 60 and one stop means 62 in place of the pair of such means used in the FIG. 3 construction.

The bracket 42 has secured thereto at a position between the shafts 40, 40 a guide shaft 64 which slides in platform 38 and is secured thereto in any desired adjusted position by means of the wing nut 66. Handle 68 secured to connecting bracket 42 enables the operator to easily move the guide blocks 44, 44 and cutting tip 50 carried thereby to any desired adjusted position for regrooving tires of different sizes by merely loosening the wing nut 66, moving the platform and the cutting tip carried thereby into proper cutting relation to the tread portion of the tire to be regrooved and then locking the cutting tip in said position of adjustment by merely tightening the wing nut 66.

A link 70 is connected at one end 71 to the regroover cutter support 46 and at the other end 72 to a member 73 pivotally mounted on the connecting bracket 42.

The member 72 has a handle 74. Rotating the member 73 clockwise will retract the cutting tip carried by the regroover cutting support 46, against the tension of spring 56, in order to remove the cutting tip from engagement with the tire being grooved. Rotation of handle 74 to the position in which it contacts stop 76 will automatically hold the cutting tip away from the tire since the connecting point 72 on member 73 of link 70 will then be on the left side of the pivot point of member 73 and in this position the springs 56 cannot move the cutting tip towards the tire, as illustrated in dotted lines in FIG. 1. Rotating handle 74 counterclockwise to its initial position permits the cutting tip biased by springs 56, to automatically return to its proper cutting position.

This structure permits the operator of the tire grooving machine to inspect the tread portion of the tire as it moves downwardly in a clockwise direction relative to the cutting tip as illustrated in FIG. 8, for foreign objects, such as stones, glass or nails which could damage the machine especially the cutting tip and if necessary, stop the machine by means of control switch 78, retract the cutting tip from engagement with the tread portion of the tire by movement of handle 74, remove the foreign objects from the tread portion of the tire and again automatically position the cutting tip relative to the tread portion of the tire by merely moving handle 74 counterclockwise.

The biasing springs 56 also serve the additional function of preventing damage to the tire being regrooved since they permit the guide blocks or heads carrying the cutting tip to move horizontally away from the tread portion of the tire when the cutting tip comes into contact with the cord fabric of the tire due to a low spot or other defect in the tire while at the same time keeping maximum tension of the cutting tip to properly regroove the tire.

In order to control the type or design of the tread being cut in the tire, an adjustable eccentric for moving the cutting tip transversely of the face of the tire while it is being regrooved is provided.

This structure comprises a connecting rod 80 secured at 81 to the connecting bracket 33 and at the other end to a bearing 82 mounted on the eccentric 84. The eccentric 84 is secured to a flange 86 on eccentric shaft 88 by means of a pivot pin 90 at one side of the flange and a lockscrew 92 which slides in a slot 93 on the other side of said flange. Varying the position of the eccentric 84 on the flange 86 by means of the lockscrew 92 adjusts the amount of transverse shift of the cutting tip relative to the tread portion of the tire within the limits of adjustment which may vary from zero to 7/8" and in this manner various designs of tread can be cut in the tread portion of the tire.

Eccentric shaft 88 is operated at various speeds by means of the adjustable torque converter 94 driven by the drive motor 96 through conventional pulleys 98 and 100 connected by belts or by sprockets and sprocket chains. While a torque converter is disclosed for obtaining different speeds, it is obvious that any other well known means for obtaining different speeds may be used for this purpose. Motor 96 also drives shaft 12 on which the tire carrying wheel 24 is mounted, at the proper speed by means of a gear reduction means 102 and a plurality of conventional pulleys such as 98, 104, 16 connected by belts or by sprockets and sprocket chains.

In this manner the single drive motor 96 synchronously drives the means for rotating the tire being grooved and the eccentric means for transversely moving the cutting tip in order to produce the desired tread design on the tire being grooved.

It will be understood that the structure illustrated is shown by way of example only and the invention is not limited thereto, since many modifications may be made without departing from the underlying principles and teachings of the invention as set forth.

I claim:
1. A tire grooving machine comprising a frame, tool supporting means carried by said frame adjustable along perpendicular paths lying in a plane, tire mounting means carried by said frame rotatable about an axis parallel to one of said paths and lying in a plane parallel to the plane of said paths, said tire mounting means being adapted to receive a tire having an axis coincident with said axis of rotation, a tool carried by said tool supporting means and slidable relative thereto towards and from said axis, biasing means urging said tool towards said axis relative to said tool supporting means, stop means limiting movement of said tool towards said axis, means for retracting said tool relative to said tool supporting means, and means including reciprocating means having a stroke of adjustable magnitude for driving said tool supporting means parallel to said axis and said tire mounting means in synchronism, said reciprocating means comprising a rotary shaft pivotally carrying an adjustable eccentric, said eccentric carrying a bearing, and a connecting rod having opposite ends connecting said bearing and said tool supporting means.

2. A tire grooving machine as set forth in claim 1 wherein said tool supporting means comprises a pair of parallel shafts extending towards said tire mounting means, said stop means comprising a stop member on each of said shafts, a head movable relative to said shafts, said tool being secured to said head, and said biasing means comprising spring means urging said head towards said stop members.

3. A tire grooving machine as set forth in claim 1 wherein said retracting means includes a pivoted member having one position maintaining said tool out of engagement with a tire on said mounting means.

4. A tire grooving machine as set forth in claim 1 wherein said tool has a cutting edge lying in a plane forming an angle with a plane normal to the plane of said paths of substantially 16°.

References Cited in the file of this patent
UNITED STATES PATENTS

| | | |
|---|---|---|
| 1,486,474 | Baker | Mar. 11, 1924 |
| 1,521,238 | Gammeter | Dec. 30, 1924 |
| 2,000,129 | Dunham | May 7, 1935 |
| 2,749,979 | Prewett | June 12, 1956 |
| 2,891,605 | Love | June 23, 1959 |
| 2,925,125 | Curry | Feb. 16, 1960 |
| 2,972,376 | Garmon | Feb. 21, 1961 |